US006658473B1

(12) United States Patent
Block et al.

(10) Patent No.: US 6,658,473 B1
(45) Date of Patent: Dec. 2, 2003

(54) METHOD AND APPARATUS FOR DISTRIBUTING LOAD IN A COMPUTER ENVIRONMENT

(75) Inventors: Robert J. Block, Mountain View, CA (US); James G. Hanko, Redwood City, CA (US); J. Kent Peacock, Menlo Park, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/513,655

(22) Filed: Feb. 25, 2000

(51) Int. Cl.$^7$ ............................................. G06F 15/173
(52) U.S. Cl. ...................................... 709/226; 709/229
(58) Field of Search ................................ 709/203, 213, 709/223–226, 228–229, 240–242

(56) References Cited

U.S. PATENT DOCUMENTS

| | | | | |
|---|---|---|---|---|
| 5,774,660 A | * | 6/1998 | Brendel et al. | 709/201 |
| 5,938,722 A | | 8/1999 | Johnson | |
| 5,951,694 A | * | 9/1999 | Choquier et al. | 714/15 |
| 6,070,191 A | * | 5/2000 | Narendran et al. | 709/226 |
| 6,098,108 A | * | 8/2000 | Sridhar et al. | 709/239 |
| 6,138,162 A | * | 10/2000 | Pistriotto et al. | 709/229 |
| 6,185,601 B1 | * | 2/2001 | Wolff | 709/203 |
| 6,223,289 B1 | * | 4/2001 | Wall et al. | 713/201 |
| 6,249,800 B1 | * | 6/2001 | Aman et al. | 709/105 |
| 6,314,465 B1 | * | 11/2001 | Paul et al. | 709/226 |
| 6,327,622 B1 | * | 12/2001 | Jindal et al. | 709/228 |
| 6,370,620 B1 | * | 4/2002 | Wu et al. | 711/132 |
| 6,389,448 B1 | * | 5/2002 | Primak et al. | 709/105 |
| 6,401,121 B1 | * | 6/2002 | Yoshida et al. | 709/227 |
| 6,412,004 B1 | * | 6/2002 | Chen et al. | 709/226 |
| 2003/0037160 A1 | * | 2/2003 | Wall et al. | 709/233 |

FOREIGN PATENT DOCUMENTS

| | | |
|---|---|---|
| EP | 0 426 354 A2 | 10/1990 |
| EP | 0 828 214 A2 | 9/1997 |
| WO | WO 97/29424 | 8/1997 |
| WO | WO 97/45792 | 12/1997 |
| WO | WO 99/18534 | 4/1999 |

OTHER PUBLICATIONS

By Aman et al., "Adaptive Algorithms for Managing a Distributed Data Processing Workload", IBM Systems Journal, vol. 36, No. 2, 1997, pp. 242–283.

By Raouf Boutaba and Abdelhakim Hafid, "A Generic Platform for Scalable Access to Multimedia–on–Demand Systems", IEEE Journal on Selected Areas in Communications, vol. 17, No. 9, Sep. 1999, pp. 1599–1613.

* cited by examiner

*Primary Examiner*—Bunjob Jaroenchonwanit
(74) *Attorney, Agent, or Firm*—O'Melveny & Myers LLP

(57) ABSTRACT

The present invention provides a method and apparatus for distributing load in a multiple server computer environment. In one embodiment, a group manager process on each server periodically determines the server's capacity and load (i.e., utilization) with respect to multiple resources. The capacity and load information is broadcast to the other servers in the group, so that each server has a global view of every server's capacity and current load. When a given terminal authenticates to a server to start or resume one or more sessions, the group manager process of that server first determines whether one of the servers in the group already is hosting a session for that user. If that is the case, one embodiment of the present invention redirects the desktop unit to that server and the load-balancing strategy is not employed. Otherwise, for each resource and server, the proper load balancing strategies are performed to identify which server is best able to handle that particular session.

14 Claims, 13 Drawing Sheets

METHOD AND APPARATUS FOR DISTRIBUTING LOAD IN A COMPUTER ENVIRONMENT

BACKGROUND OF THE INVENTION

1. Field of the Invention

This invention relates to the field of networked computer systems in a multiple server environment.

2. Background Art

Computer users continue to desire high performance computing experiences in ever-changing computer environments. The computing paradigm is shifting. New architectures are emerging which require new solutions to deal with the need for a high performance computing experience. One such architecture is that of the thin client computing system. In this architecture, the functionality of the end user computer is reduced to the point that, for the most part, only input and output capabilities exist. The end user computer is connected over a high bandwidth computer network to a more powerful server computer which performs all the functions traditionally associated with the personal computer, such as executing computer programs and processing data.

In this type of architecture, a large number of end users can connect to a limited number of servers. In addition, the limited number of servers are also interconnected, creating what is termed as a multiple server environment wherein any of the end user terminals could potentially connect to any of the servers. In multiple server environments it is common for the environment to be heterogeneous, in that each server has differing resource capabilities. In such complex multiple server environments, the load on the servers' resources often becomes unbalanced, meaning, for example, that one server is performing at essentially maximum capacity while another server is relatively unused. Overcoming this load imbalance, therefore, becomes an extremely important concern, if a high performance computing experience is to be provided.

The evolution that led to this problem is better understood by reviewing the development of network computing. The rise of the internet has resulted in the proposed use of so-called "network computers." A network computer is a stripped down version of a personal computer with less storage space, less memory, and often less computational power. The idea is that network computers will access data and applications through a computer network, such as the internet, intranet, local area network, or wide area network. Only those applications that are needed for a particular task will be provided to the network computer. When the applications are no longer being used, they are not stored on the network computer.

Recently, a new computer system architecture referred to as the virtual desktop architecture has emerged. This system provides for a re-partitioning of functionality between a central server installation and the user hardware. Data and computational functionality are provided by data sources via a centralized processing arrangement. At the user end, all functionality is substantially eliminated except that which generates output to the user (e.g. display and speakers), takes input from the user (e.g. mouse and keyboard) or other peripherals that the user may interact with (e.g. scanners, cameras, removable storage, etc.)

All computing is done by one or more servers acting as central data sources and the computation is done independently of the destination of the data being generated. The output of a data source is provided to a terminal, referred to herein as a "Desktop Unit" (DTU). The DTU is capable of receiving the data and displaying the data.

The virtual desktop system architecture may be analogized to other highly-partitioned systems. For example, a public telephone company maintains powerful and sophisticated processing power and large databases at central offices. However, the DTU, (e.g., the telephone), is relatively simple and does not require upgrading when new features or services are added by the telephone company. The telephone itself becomes an appliance of low cost and extremely low obsolescence. Similarly, the display monitor of most computer systems has low obsolescence, and is typically retained through most desktop system upgrades.

The provision of services in the virtual desktop system architecture revolves around an abstraction referred to herein as a "session." A session is a representation of those services which are executing on behalf of a user at any point in time. The session abstraction is maintained by facilities known as the authentication and session managers, whose duty it is to maintain the database of mappings between tokens (i.e., unique identifiers bound to smart cards or other authentication mechanisms) and sessions, and to manage the services which make up each session. For each user that the system is aware of there are one or more sessions. The session manager offers a service to the user that allows sessions to be configured and new sessions to be created.

In a multiple server environment, multiple sessions may be executing on each server. These sessions are initiated by multiple users accessing the DTUs. If one of these servers fails (e.g., loses power), each of the DTUs connected to it "fails over" to one of the surviving servers. Since the computational and memory resources allocated to the services requested by the DTUs are distributed across the group of servers, it is possible for resources to become unevenly allocated, thereby degrading performance on over-utilized servers while wasting resources on under-utilized servers. This is especially true in heterogeneous server configurations, where the carrying capacity of the servers (i.e., number and speed of processing units, amount of installed memory and available network bandwidth, for instance) is non-uniform. In addition, each session may demand differing quantities of resources adding to the non-uniformity of the resources allocated.

Furthermore, the presence of failures complicates the load distribution problem, because if a server hosting a large number of DTUs fails, all of the DTUs will attempt to fail over within a short time period. It is crucial in this situation not to unbalance the remaining servers by connecting failed over sessions to a single server or an already overburdened server. Clearly, a more intelligent load balancing strategy is needed to achieve optimal resource allocation in this complex multiple server environment.

SUMMARY OF THE INVENTION

The present invention provides a method and apparatus for distributing load in a multiple server computer environment. In one embodiment, a group manager process on each server periodically determines the server's capacity and load (i.e., utilization) with respect to multiple resources. The capacity and load information is broadcast to the other servers in the group, so that each server has a global view of every server's capacity and current load.

When a user attempts to access a DTU, the user inserts an identifier into the DTU which contains a unique token. This identifier is a smart card, in one embodiment. Once the identifier is inserted, the DTU uses the token to attempt to establish communications with the servers to start or resume one or more sessions. When a given DTU successfully starts or resumes a given session, the group manager process of that server first determines whether one of the servers in the group already is hosting the session for that token. If that is the case, one embodiment redirects the DTU to that server and the load-balancing strategy is not employed. Otherwise, for each resource and server, the proper load balancing strategies are performed to identify which server is best able to handle that particular session.

The load balancing strategies are designed to take into account one or more factors, such as the number and speed of the microprocessors at a given server, the amount of random access memory ("RAM") at a given server, the amount of network bandwidth available to a given server, the number of sessions running on a given server relative to that server's carrying capacity (e.g., the maximum number of sessions that server can host), the states of sessions running on a server (e.g., active or inactive), and the expected usage habits of certain users. In one embodiment, the load distribution strategy determines the relative desirability of assigning a new session to that server and assigns the session to the most desirable server.

In another embodiment, sessions are assigned to servers in a pseudo-random fashion, with the relative probability of selection of a server being weighted by its relative desirability. Pseudo-random selection is used primarily in fail over situations in which many sessions are being concurrently authenticated. In another embodiment, a hybrid strategy is used, which combines the use of the relative desirability strategy, and the use of pseudo-random strategy depending on the state of the server at that time. Thus, load balancing strategies result in a higher performance computing experience for the end user.

DETAILED DESCRIPTION OF THE INVENTION

Figure 1:
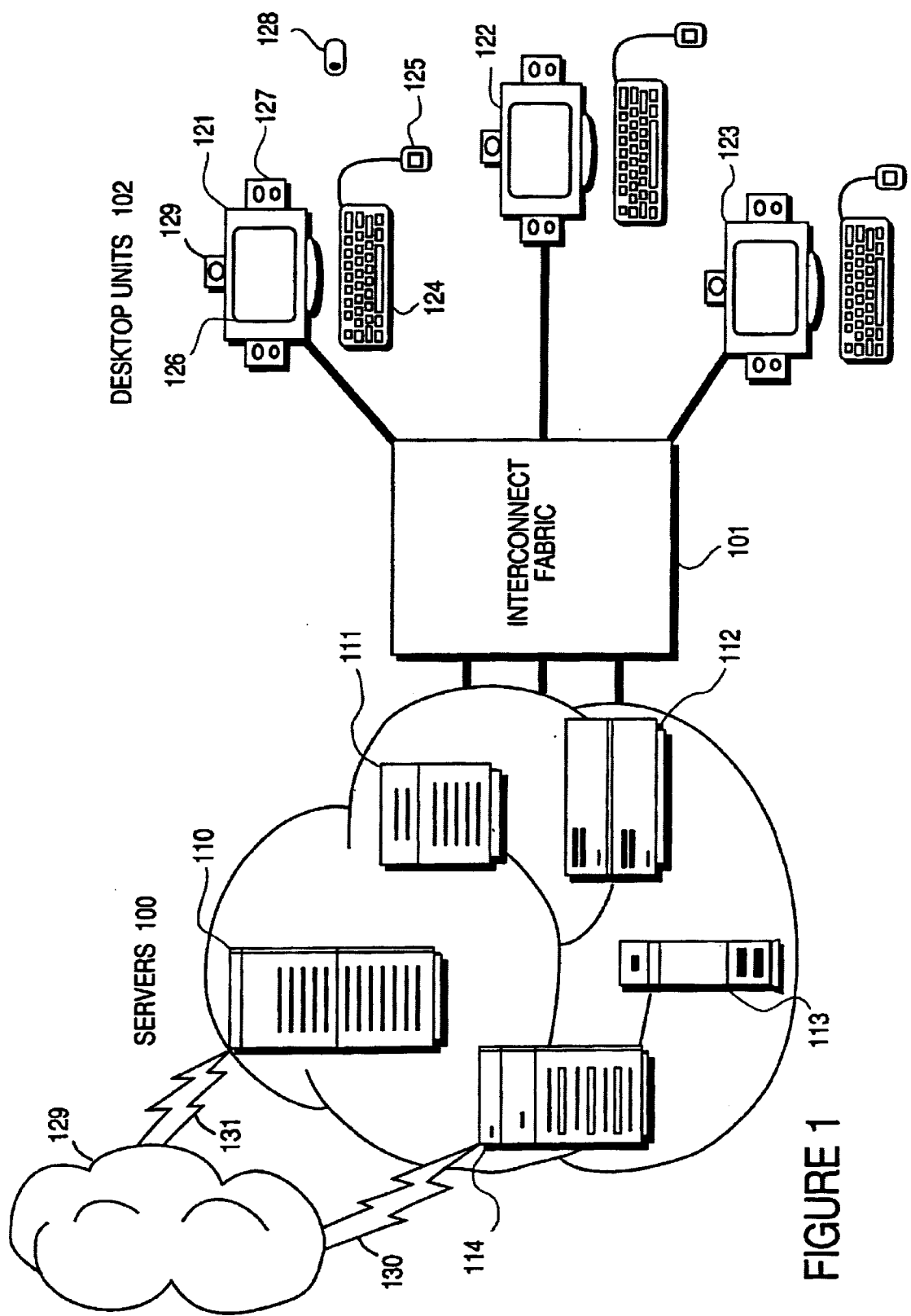
FIG. 1 illustrates the virtual desktop system architecture of the present invention.

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

One or more embodiments of the invention may implement the mechanisms for improved resource utilization described in U.S. patent application Ser. No. 09/513,052, filed on Feb. 25, 2000, entitled "Method and Apparatus for Improving Utilization of a Resource on a Shared Client", and assigned to the present assignee, the specification of which is incorporated herein by reference.

One or more embodiments of the invention may also implement the mechanisms for making a computational service highly available described in U.S. patent application Ser. No. 09/513,015, filed on Feb. 25, 2000, entitled "Method and Apparatus for Making a Computational Service Highly Available", and assigned to the present assignee, the specification of which is incorporated herein by reference.

The present invention provides a method and apparatus for distributing load in a multiple server computer environment by implementing a group manager process on each server, which periodically determines the server's capacity and load (i.e., utilization) with respect to multiple resources. The capacity and load information is broadcast to the other servers in the group, so that each server has a global view of every server's capacity and current load.

When a user attempts to access a DTU, the user inserts a unique identifier into the DTU. This identifier may be a smart card, password, biometric mechanism, or other mechanism which facilitates the identification of a user. Once the identifier is inserted, the DTU attempts to establish communications with the servers to start or resume one or more sessions. When a given DTU successfully starts or resumes a session, the group manager process of that server first determines whether one of the servers in the group already is hosting the session for that user. If that is the case, one embodiment redirects the DTU to that server and the load-balancing strategy is not employed. Otherwise, for each resource and server, the proper load balancing strategies are performed to identify which server is best able to handle that particular session.

Virtual Desktop System Architecture

In one embodiment, the present invention is implemented in the computer system architecture referred to as the virtual desktop system architecture. This material is described in co-pending U.S. patent application Ser. No. 09/063,335, filed Apr. 20, 1998, entitled "Method and Apparatus for Providing a Virtual Desktop System Architecture" and assigned to the present assignee, and incorporated herein by reference.

The virtual desktop system architecture provides for a re-partitioning of functionality between a central server installation and the user hardware. Data and computational functionality are provided by the servers via a centralized processing arrangement. At the user end, all functionality is eliminated except that which generates output to the user (e.g. display and speakers), takes input from the user (e.g. mouse and keyboard) or other peripherals that the user may interact with (e.g. scanners, cameras, removable storage, etc.).

All computing is done by the central servers and the computation is done independently of the destination of the data being generated. The output of the server is provided to a DTU. The DTU is capable of receiving the data and displaying the data. The functionality of the system is partitioned between a display and input device and servers. The display and input device is the DTU. The partitioning of this system is such that state and computation functions have been removed from the DTU and reside on servers. In one embodiment of the invention, one or more servers communicate with one or more DTUs through some interconnect fabric, such as a network.

An example of such a system is illustrated in FIG. 1. Referring to FIG. 1, the system consists of servers 100 communicating data through interconnect fabric 101 to DTUs 102. It should be noted, however, that load balancing strategies are not limited to the virtual desktop system architecture. Embodiments of the present invention are implemented in conjunction with a general purpose computer, like that described in FIG. 2.

Embodiment of General-Purpose Computer Environment

Figure 2:
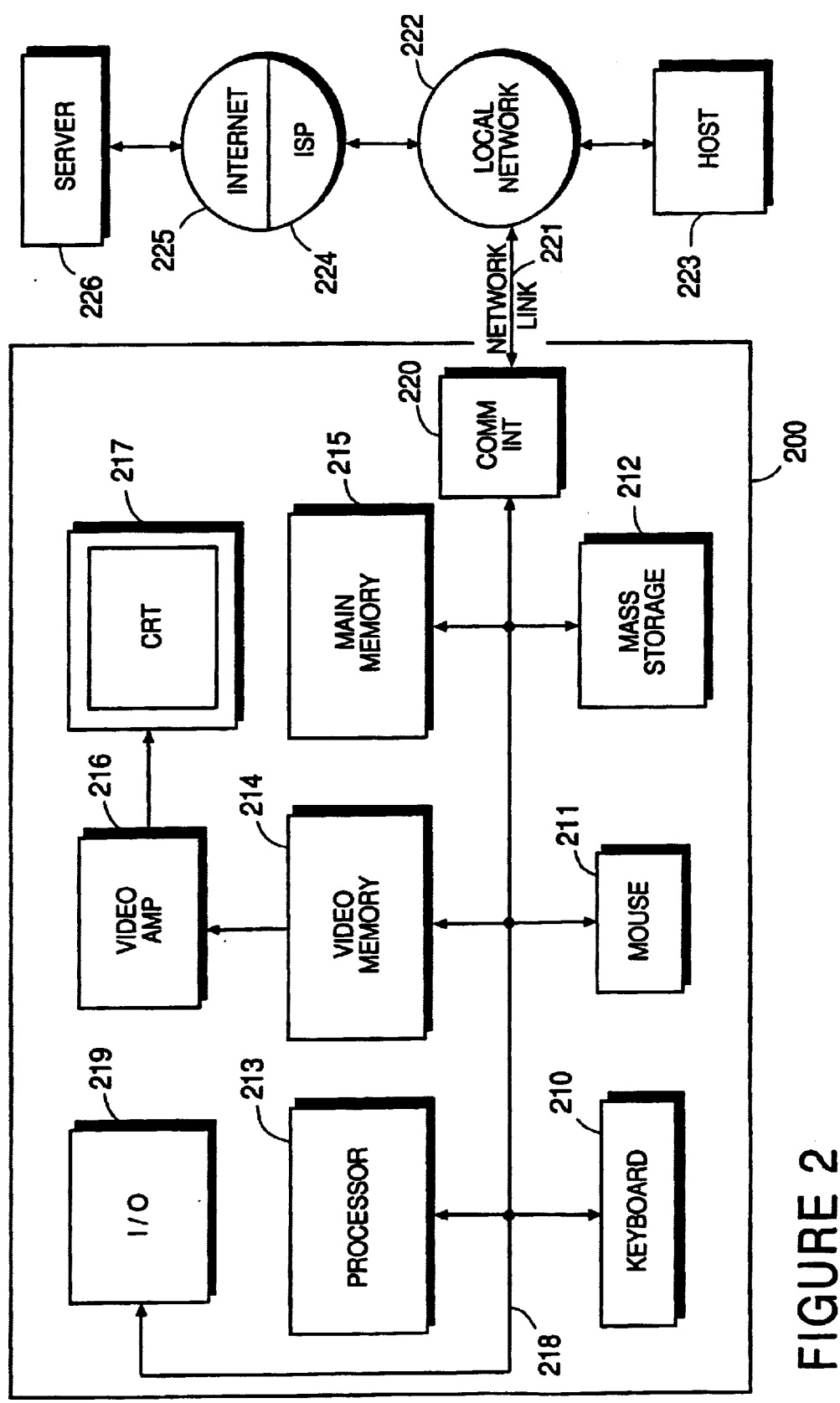
FIG. 2 is a block diagram of an example computer system that can be used with the present invention.

One embodiment of the invention can be implemented as computer software in the form of computer readable program code executed on a general purpose computer such as computer 200 illustrated in FIG. 2. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and. Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the using and accessing of information from fonts in multiple formats described herein.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Computational Service Providers

With reference to the virtual desktop system architecture, computational power and state maintenance is found in the service providers, or services. The services are not tied to a specific computer, but may be distributed over one or more traditional desktop systems such as described in connection with FIG. 2, or with traditional servers. One computer may have one or more services, or a service may be implemented by one or more computers. The service provides computation, state, and data to the DTUs and the service is under the control of a common authority or manager. In FIG. 1, the services are found on computers 110, 111, 112, 113, and 114. It is important to note that the central data source can also be providing data that comes from outside of the central data source 129, such as for example, the internet or world wide web 130. The data source could also be broadcast entities such as those that broadcast data such as television or radio signals 131. A service herein is a process that provides output data and responds to user requests and input.

It is the responsibility of the service to handle communications with the DTU that is currently being used to access the given service. This involves taking the output from the computational service and converting it to a standard protocol for the DTU. This data protocol conversion is handled in one embodiment of the invention by a middleware layer, such as the X11 server, the Microsoft Windows interface, a video format transcoder, the OpenGL interface, or a variant of the java.awt.graphics class within the service producer machine, although other embodiments are within the scope of the invention. The service machine handles the translation to and from the virtual desktop architecture wire protocol.

The service producing computer systems connect directly to the DTUs through the interconnect fabric. It is also possible for the service producer to be a proxy for another device providing the computational service, such as a database computer in a three tiered architecture, where the proxy computer might only generate queries and execute user interface code.

Interconnect Fabric

The interconnect fabric is any of multiple suitable communication paths for carrying data between the services and the DTUs. In one embodiment, the interconnect fabric is a local area network implemented as an Ethernet network. Any other local network may also be utilized. The invention also contemplates the use of wide area networks, the internet, the world wide web, an intranet, a local area network, and others. The interconnect fabric may be implemented with a physical medium such as a wire or fiber optic cable, or it may be implemented in a wireless environment.

Desktop Units

The DTU is the means by which users access the services. FIG. 1 illustrates DTUs 121, 122, and 123. A DTU may consist of a display 126, a keyboard 124, mouse 125, and audio speakers 127. The DTU includes the electronics needed to interface these devices to the interconnect fabric and to transmit to and receive data from the services.

Figure 3:
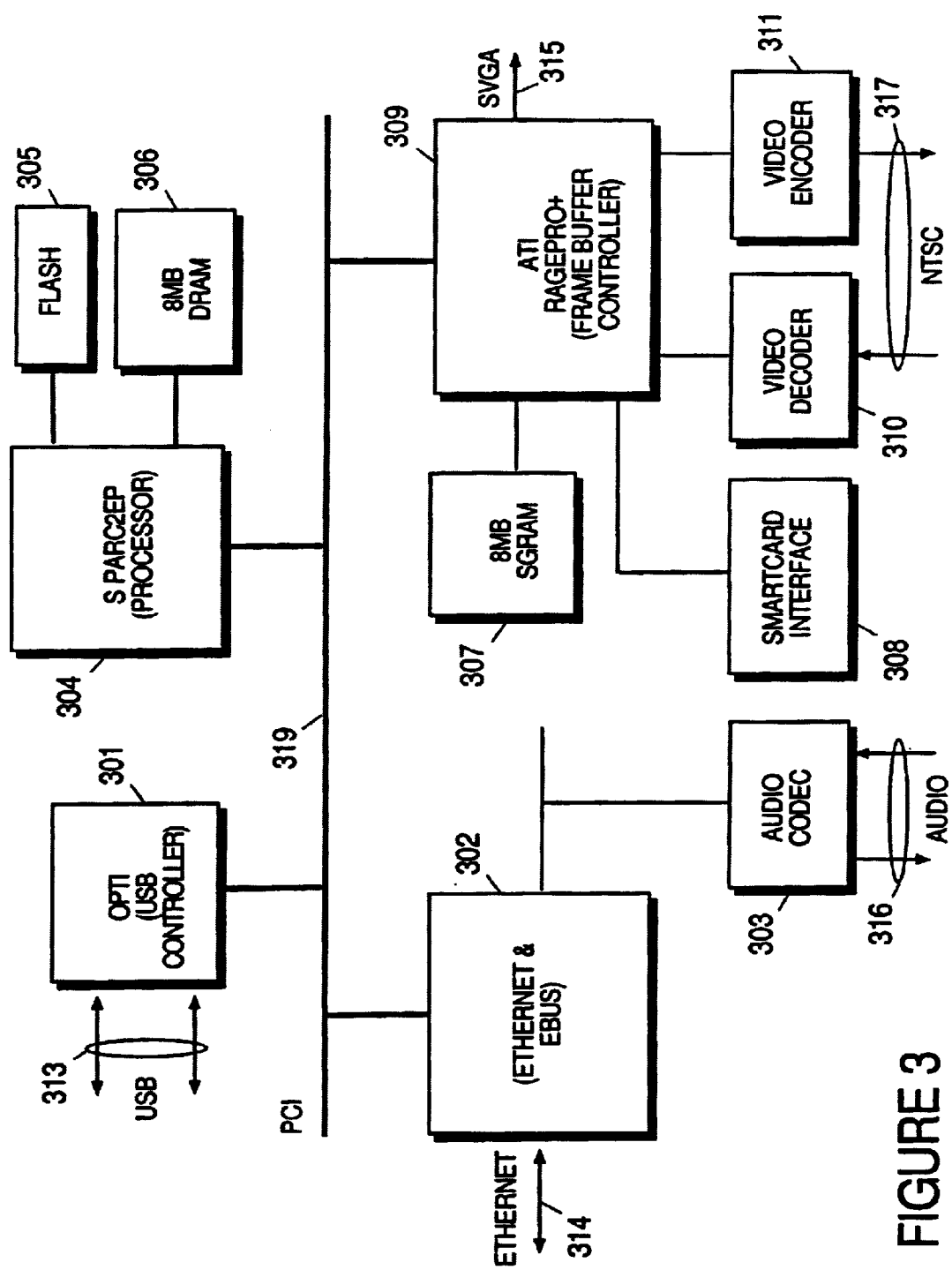
FIG. 3 is a block diagram of one embodiment of an DTU of the present invention.

A block diagram of a DTU is illustrated in FIG. 3. The components of the DTU are coupled internally to a PCI bus 319. A network controller 302 communicates to the interconnect fabric, such as an ethernet, through line 314. An audio codec 303 receives audio data on interface 316 and is coupled to network controller 302. USB data communication is provided on lines 313 to USB controller 301.

An embedded processor 304 may be, for example, a Sparc2ep with coupled flash memory 305 and DRAM 306. The USB controller 301, network controller 302 and embedded processor 304 are all coupled to the PCI bus 319. Also coupled to the PCI bus 319 is the video controller 309 with associated SGRAM 307. The video controller 309 may be for example, an ATI RagePro+frame buffer controller that provides SVGA output on line 315. Data is optionally provided in and out of the video controller through video decoder 310 and video encoder 311 respectively. This data may comprise digital or analog video signals (e.g., NTSC (National Television Systems Committee), PAL (Phase Alternate Line), etc.). A smart card interface 308 may also be coupled to the video controller 309.

Figure 4:
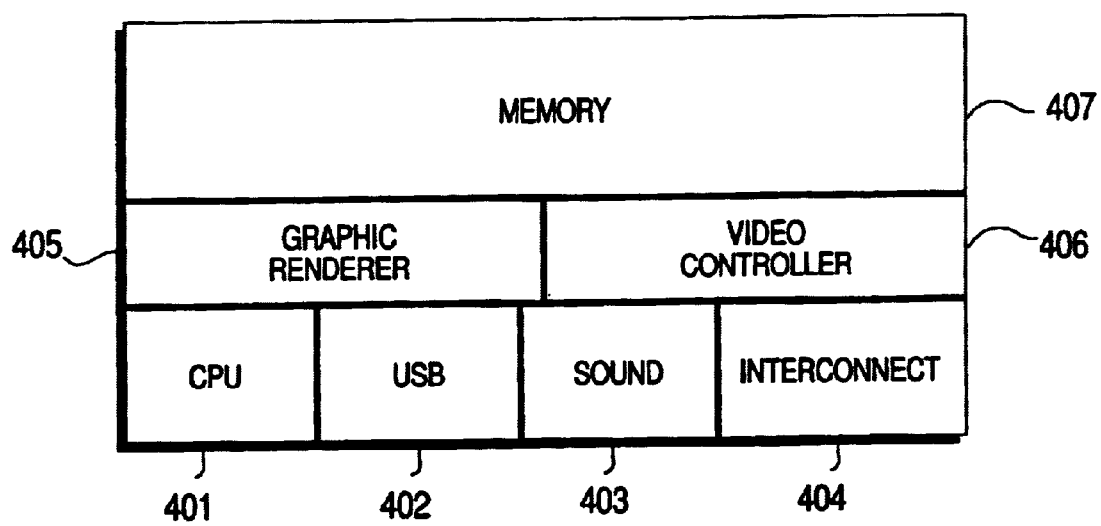
FIG. 4 illustrates a single chip DTU embodiment of the present invention.

Alternatively, the DTU can be implemented using a single chip solution as illustrated in FIG. 4. The single chip solution indudes the necessary processing capability implemented via CPU 401 and graphics renderer 405. Chip memory 407 is provided, along with video controller/interface 406. A universal serial bus (USB) controller 402 is provided to permit communication to a mouse, keyboard and other local devices attached to the DTU. A sound controller 403 and interconnect interface 404 are also provided. The video interface shares memory 407 with the CPU 401 and graphics renderer 405. The software used in this embodiment may reside locally in non-volatile memory or it can be loaded through the interconnect interface when the device is powered.

OPERATION OF THE VIRTUAL DESKTOP SYSTEM ARCHITECTURE

Session Handling

The provision of services in the virtual desktop system architecture revolves around an abstraction referred to herein as a session. A session is a representation of those services which are executing on behalf of a user at any point in time. A new session is created when a new token is presented through the DTU to the authentication manager. A token is a unique identifier, which may be an ethernet address of a DTU (pseudo-token) or the serial number on a smart card.

The session abstraction is maintained by facilities known as the authentication and session managers, whose duty it is to maintain the database of mappings between tokens and sessions, and to manage the services which make up each session. For each token that the system is aware of the fact that there are one or more sessions. The session manager offers a service to the user or administrator that allows sessions to be configured and new sessions to be created.

A session is not tied to any particular DTU. A token is associated with the user session, and the session can be displayed on any DTU where the user inserts his or her smart card. An software process known as the authentication manager is responsible for ensuring the legitimacy of a token and associating a token with its desired session. The DTU is typically in sleep, stand-by, or off mode when not in use. When a user wants to use a particular DTU, the user's access is validated in an authentication exchange that may comprise one or more of a smart card, key, password, biometric mechanism, or any other suitable authentication mechanism. The token extracted from this exchange is then used to establish a connection to the appropriate session When the authentication manager validates a token, it notifies the server's session manager, which in turn notifies all of the services within the selected session, and the session's display is composed at the server and transmitted to the user's desktop. From within a session, a user can interact with existing services, initiate new services, or kill off executing services. When the user departs from the DTU (e.g., by withdrawing a smart card) the authentication manager notes this and notifies the session manager, which in turn notifies all of its related services, which stop their display functions, and the DTU returns to its dormant state. The effect of the activation and deactivation of an DTU is similar to turning off the display monitor on a desktop system. The services of the user's session are still available and perhaps executing, but no display is generated. One advantage of the present invention is that the services available in a session can be accessed on any connected DTU.

Figure 5:
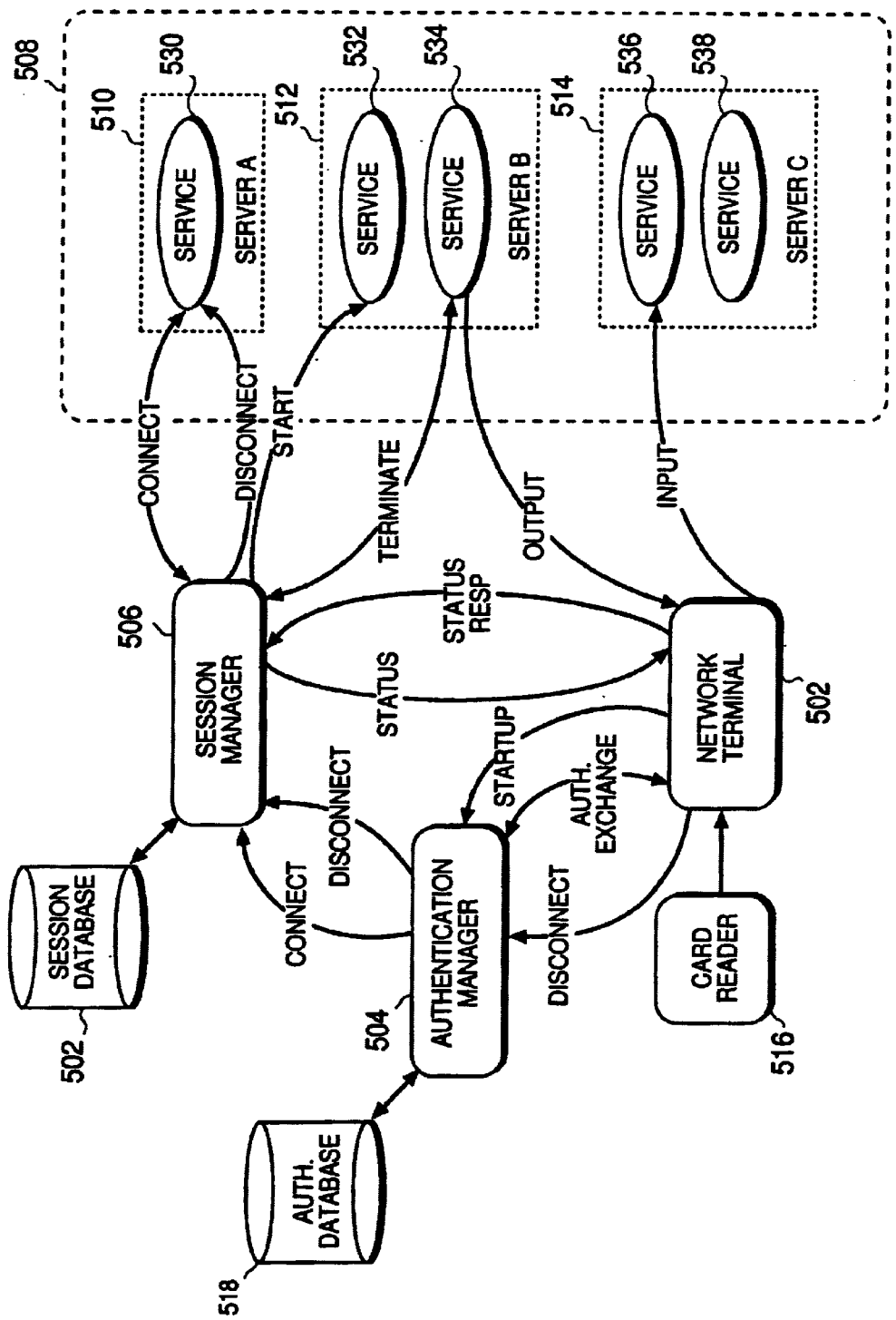
FIG. 5 illustrates an example of session management and authorization in the present invention

FIG. 5 provides an example of session management and authorization in the present invention. This material is described in co-pending U.S. patent application Ser. No. 09/063,339, filed Apr. 20, 1998, entitled "Method and Apparatus for Session Management and User Authentication" and assigned to the present assignee, and incorporated herein by reference. Network terminal 502 is a DTU, having the task of displaying output of services to a user and obtaining input to services from the user. Network terminal 502 has the ability to respond to a command (e.g., display command) received from, for example, a software program (e.g., services 530–538, authentication manager 504 and session manager 506) executing on a computational service provider. The input received from a user is forwarded to, for example, a service that is fulfilling a user request.

A service is a program that performs some function for a user. More than one server can execute the services that comprise a session. For example, in session 508, service 530 is executing on server 510, services 532 and 534 are executing on server 512 and services 536 and 538 are executing on server 514.

A user accesses a system (e.g., a server, a session, a service and a network terminal) by initiating a login. During login, the user is validated by authentication manager 504. Various techniques can be used to allow the user to initiate a login. For example, the user can initiate a login by pressing a key on network terminal 502.

In one embodiment, a user accesses the system by inserting a smart card in a card reader (e.g., card reader 516) attached to network terminal 502. A smart card is a card that is capable of storing information such as in a magnetic strip or memory of the smart card. The smart card can store user information such as a user's identification (i.e., user ID such as a 64-bit number) and, optionally, a secret code (e.g., a 128-bit random number) that is transmitted to network terminal 502. The secret code may be used during authentication.

Network terminal 502 is aware of (or can obtain) its interconnection network address and the address of authentication manager 504. When a user initiates the login, network terminal 502 initiates communication with authentication manager 504 to begin authentication. Authentication manager 504 is a program active (e.g., executing) on a server connected to network terminal 502 via an interconnection network such as a local area network (LAN), for example. It should be apparent, however, that network terminal 502 can be connected to authentication manager 504 using other interconnection network technologies such as a fiber channel loop, point-to-point cables, or wireless technologies. Network terminal 502 sends a startup request to authentication manager 504 that includes a user identification (userID).

If the expected result is received from the user, authentication manager 504 notifies session manager 506 (via a connect message) that the user has logged into the system on network terminal 502. Session information contained in authentication database 518 is used to identify the server, port and session identifier (ID) for session manager 506. Session manager 506 is a program that is active on a computational service provider and is connected to authentication manager 504 and network terminal 502 via an interconnection network, for example. Authentication manager 504 sends a message to session manager 506 using session manager 506's server and port information contained in authentication database 518.

In response to the connect message from authentication manager 504, session manager 506 notifies the services in the user's current session (i.e., the services in session 508) that the user is attached to network terminal 502. That is, session manager 506 sends a connect message to services 530–538 to direct output to network terminal 502. Session manager 506 ensures that services that are considered to be required services of the session are executing. If not, session manager 506 causes them to be initiated. The user can interact with services 530–538 within a session (e.g., session 508). Network terminal 502 is connected to servers 510, 512 and 514 (and services 530–538) via an interconnection network such as a local area network or other interconnection technology. The user can also start new services or terminate existing services.

The user can quit using the system by removing the card from card reader 516. Other mechanisms to quit the system can also be used with the invention (e.g., a "sign-off" button on network terminal 502). Services 530–538 can continue to run even after the user removes the card from card reader 516. That is, a user's associated session(s) and the services that comprise a session can continue in existence during the period that a user is logged off the system. When the user removes the card from card reader 516, network terminal 502 notifies authentication manager 504 (e.g., via a disconnect message) which notifies session manager 506 (e.g., via a disconnect message). Session manager 506 notifies services 530–538 (e.g., via a disconnect message) which terminate their transmission of display commands to network terminal 502. Services 530–538 continue execution, however, during the time that the user is away from a network terminal. The user can log back in using a network terminal such as network terminal 502, to connect to session 508 and interact with services 530–538.

OPERATION OF THE LOAD DISTRIBUTION STRATEGIES

Figure 6:
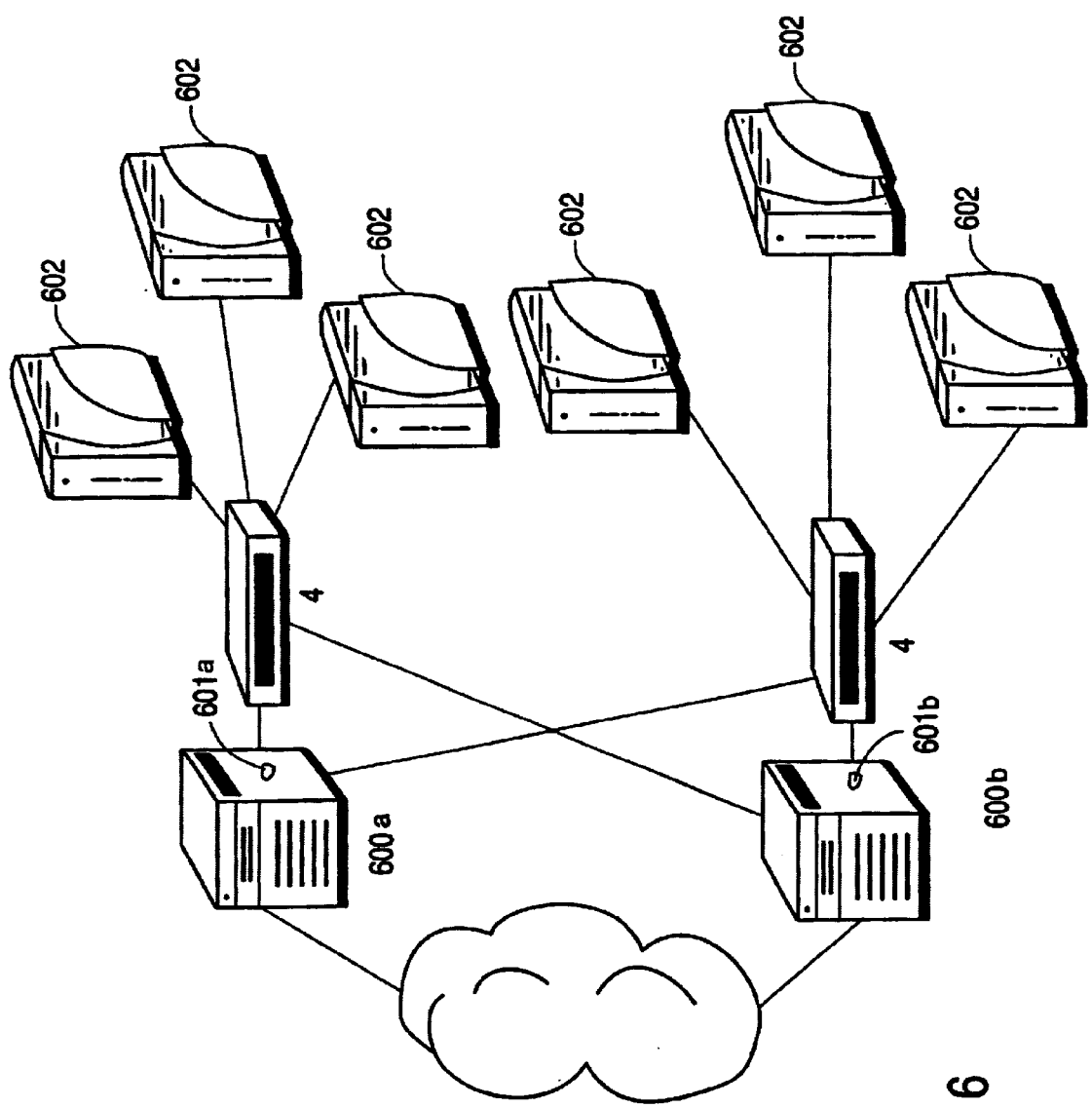
FIG. 6 illustrates the virtual desktop system architecture implementing the group manager process in accordance with the present invention.

The invention implements multiple strategies that assign sessions to servers according to their capacity, current load, and the state of the multiple server environment (e.g., whether the arrival rate of new sessions is high or low). Referring now to FIG. 6, each server 600*a* and 600*b* runs a group manager process 601*a* and 601*b* when the software running on the server (e.g., the service) is started. The group manager processes 601*a* and 601*b* on each server periodically determines system capacity and utilization on each server 600*a* and 600*b* with respect to various resources, for instance, by querying the operating system.

The load balancing strategies employed by the group manager processes are designed to take into account one or more factors, such as the number of processors, the speed of the microprocessors at a given server (measured in CPU clock cycles), the amount of random access memory ("RAM") at a given server (measured in megabytes), the amount of network bandwidth available to a given server (measured in megabits per second), the number of sessions running on a given server relative to that server's carrying capacity (e.g., the maximum number of sessions that server can host), the states of sessions running on a server (e.g., active or inactive), and the expected usage habits of certain users.

Figure 7:
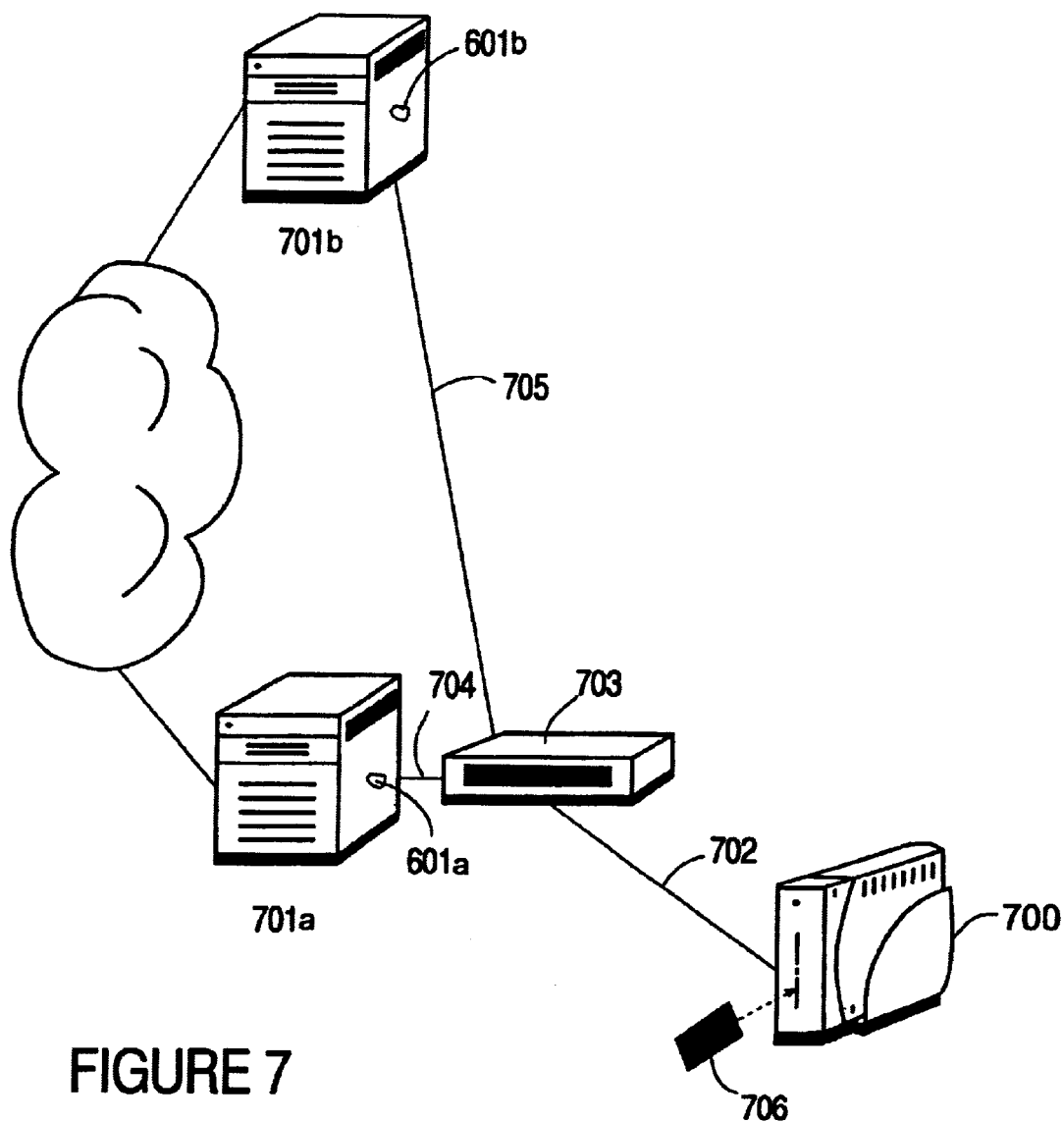
FIG. 7 is a diagram illustrating an example of server redirection in accordance with the present invention.

Referring now to FIG. 7, when a given DTU 700 attempts to establish communications with a server 701*a*, the group manager 601*a* first determines whether one of the servers 701*a* or 701*b* in the group already is hosting a session for that DTU 700. For instance, a user may insert a smart card 706 into DTU 700 and attempt to authenticate to server 701*a* via interconnect fabric 702 to switch 703, across interconnect fabric 704 and finally to server 701*a*.

Since group manager processes, 701*a* and 701*b* have periodically been communicating with each other regarding the sessions residing on each server, the group manager process 601*a* running on the server 701*a*, that the DTU 700 has attempted to establish communications with, will know if the session already resides on server 701b. If the session already resides on server 701b, in one embodiment server 701a redirects DTU 700 to server 701b via interconnect fabric 702 to switch 703 and across interconnect fabric 705 to server 701b where the session resides. In this case, the load-balancing strategy is not employed. Otherwise, for each resource and server, the relative desirability of assigning a new session to that server is computed.

Figure 8A:
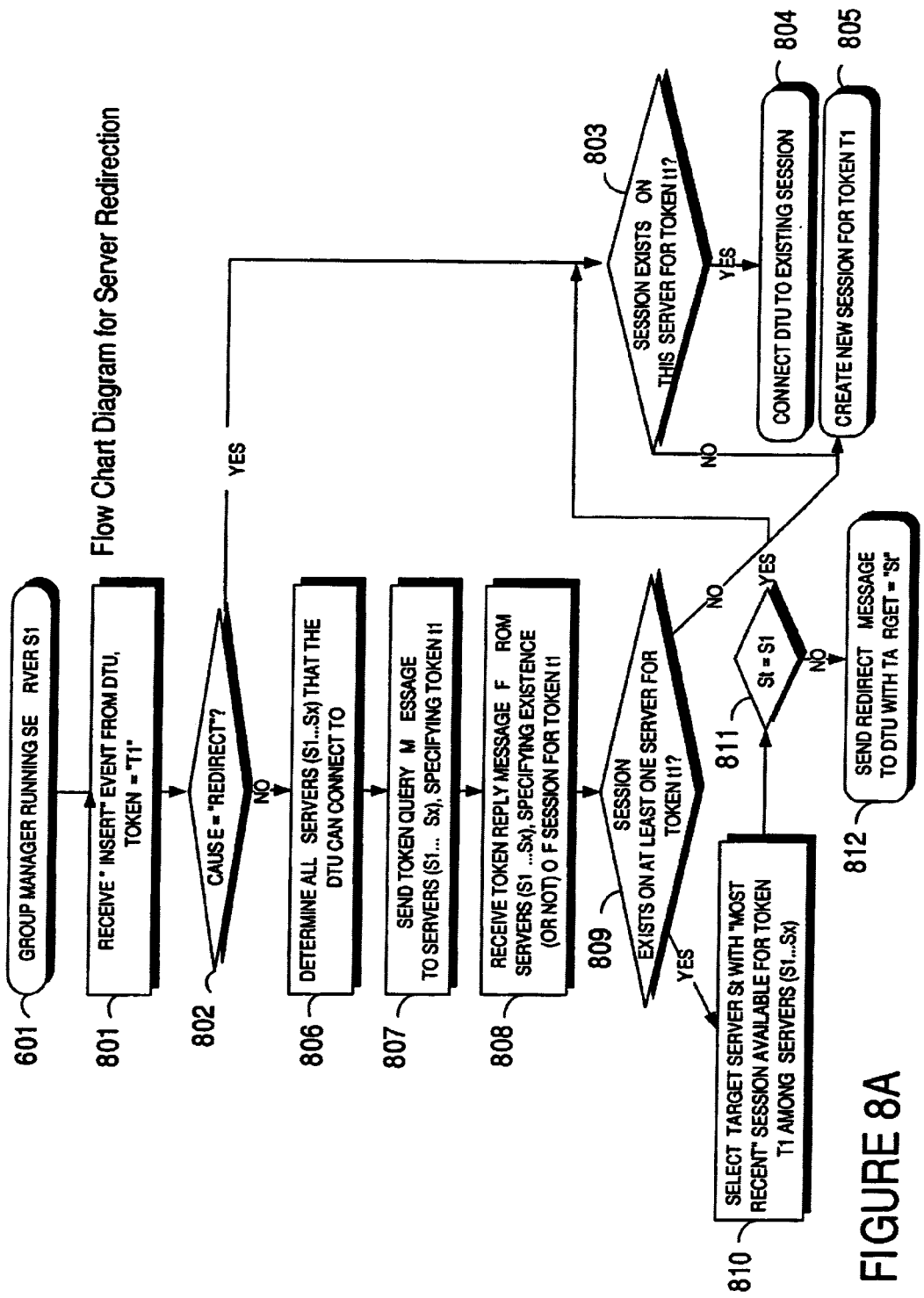
FIG. 8a is a flow control diagram of server redirection in accordance with the present invention.

The flow of the redirection process is shown in FIG. 8a. Group manager process 601 runs on server s1. A DTU attempts to initiate a session the first available server, which receives its broadcast message, for instance on server s1 801 by sending an "insert" event with a token. Group manager process 601 then reads the packet to determine whether redirection has occurred 802. If so, group manager process 601 determines whether a session exists on s1 for that token 803. If a session does exist, the DTU is connected to that session 804. If a session does not exist, a new session 805 is created.

If redirection has not occurred at step 802, group manager process 601 determines other servers (s2, . . . , sx) that the DTU can connect to 806. Next, the servers that the DTU can connect to (s1, . . . , sx) are sent messages by group manager process 601, specifying the token from the DTU 807. Thereafter, server s1 receives responses 808 from servers (s1, . . . , sx), specifying the existence (or not) of a session for the given token.

Group manager process 601 determines whether the session exists on at least one server for the token 809. If a session does not exist, a new session is created on server s1 for the token 805. If a session does exist, the target server selected is the one with the most recent session available for the token 809. The group manager process 601 then determines whether the target server is the current server 811. If the target server is not the current server s1, a redirect message is sent to the DTU, telling it to redirect to-the target server 812. If the target server is the current server s1, a transition to step 803 is made.

Figure 8B:
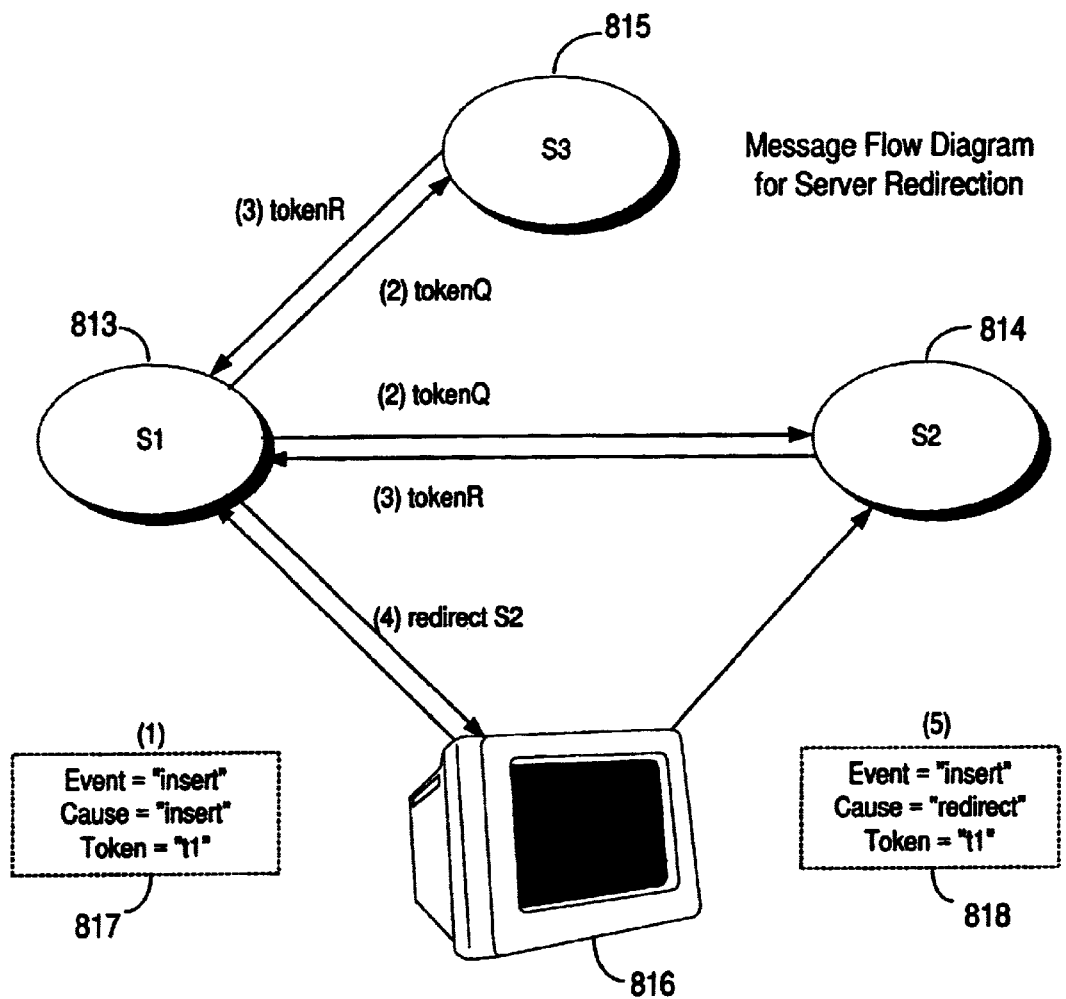
FIG. 8b is a message flow diagram of server redirection in accordance with the present invention.

FIG. 8b provides a message flow diagram for server redirection. Servers s1 813, s2 814, and s3 815 and DTU 816 pass messages. DTU 816 sends an insert event 817 (with cause="insert") to server 813. After passing tokenQ and tokenR messages, server 813 becomes aware of the fact that a session exists for token t1 on server 814. Server 813, therefore, sends a redirect message to DTU 816. Thereafter, DTU 816 sends an insert event 818 to server 815. Note that part of the message indicates that this is a redirect (i.e., cause="redirect"), thereby bypassing a repeated authentication attempt.

a. Steady State Load Balancing Strategy

A steady state exists when data is constant and the arrival rate of new sessions is low. One embodiment of the present invention implements the load balancing strategy in a steady state by determining the relative desirability of assigning a session to a server. The group manager obtains a ratio which represents the capacity of any given resource divided by the total current usage of the resource added to the total expected added usage by that resource.

In one embodiment, each group manager process residing on each server will independently compute the desirability and communicate the desirability to all other group manager processes. In another embodiment, each group manager process residing on each server will determine resource capacity and load. The group manager process will then pass resource utilization and load to all other group manager processes, which in turn will compute the desirabilities. In this way, each group manager process generates a global view of the system state. This strategy is illustrated by the following pseudo-code:

```
Begin
    determine C[r,s], U[r,s], and A[r,s] where:
        C[r,s] =  resource capacity the server has
        U[r,s] =  resource utilization on the server at time of
            sampling
        A[r,s] =  amount of the resource used on average by a
            session, based on empirical measurements
    for each resource r
        compute DR, the desirability of assigning a session to
    server s based on the resource-specific information where:
        DR[r,s] = C[r,s]/(U[r,s] + A[r,s])
    end
    select DRmax as the maximum value of DR[r,s]
    over all servers, where:
    DRmax = max{s}(DR[r,s])
    Normalize each DR[r,s] to values between 0 and 1 by dividing by the
    max value where:
        DR[r,s] = DR[r,s]/DRmax
End.
```

Figure 9:
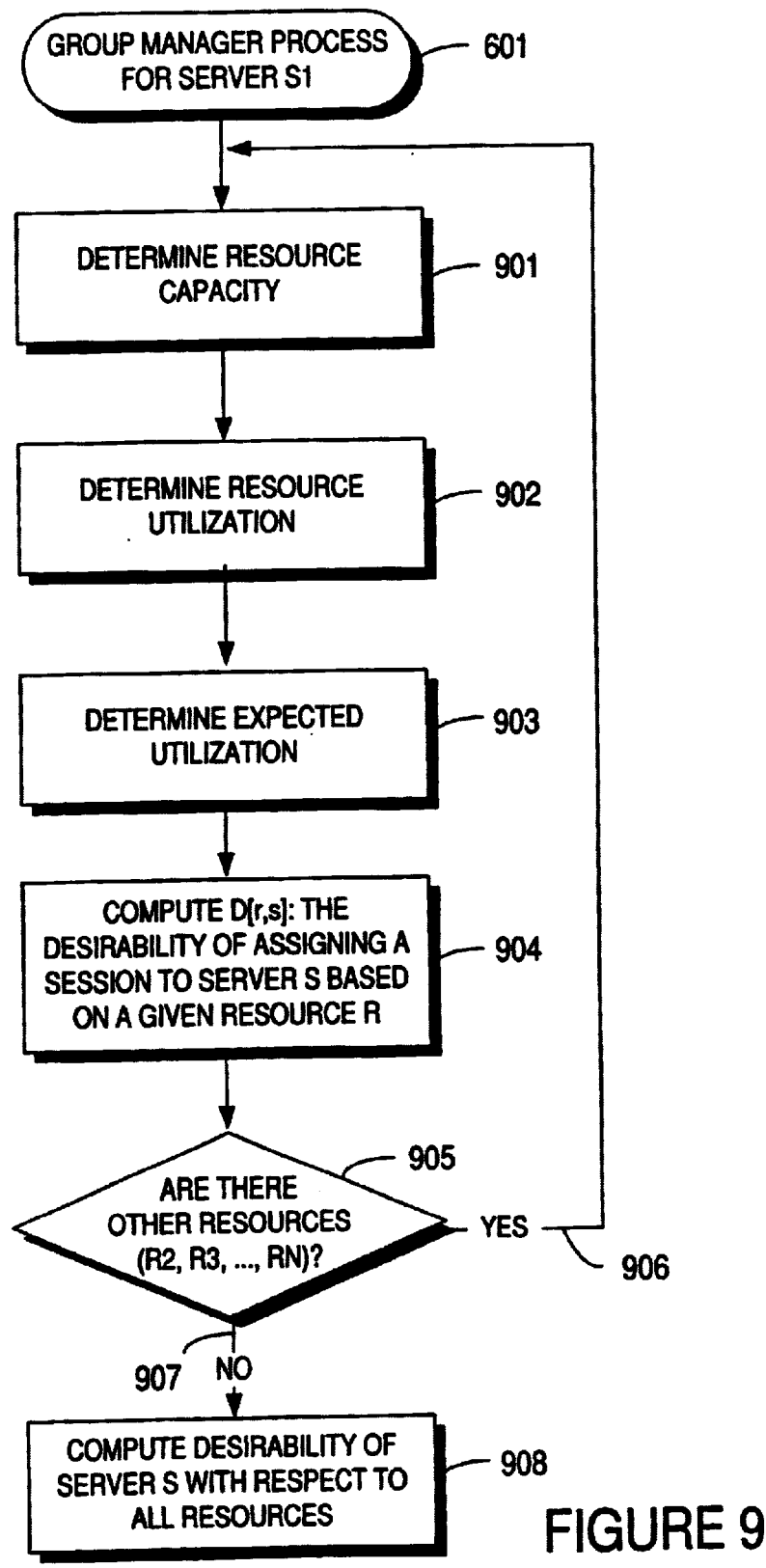
FIG. 9 is a flow control diagram of the steady state load distribution strategy.

Referring now to FIG. 9, the group manager process 601 for a given server s determines resource capacity 901 with respect to server s. Next, the group manager process determines resource utilization 902 with respect to server s. Thereafter, the group manager process determines expected utilization by a session based on empirical measurements 903. In one embodiment, this measurement is obtained by the group manager process operating under the assumption that for a large group of sessions, average resource utilization by the sessions is relatively constant.

Once this data is obtained, the group manager process computes the desirability 904 of assigning a session to the given server s with respect to the tested resource r. Next, the group manager process determines if there are other resources to consider 905. Other resources may include, the number of microprocessors at a given server (since a server may have multiple processors), the number of sessions running on a given server relative to that server's carrying capacity (e.g., the maximum number of sessions that server can host), the states of sessions running on a server (e.g., active or inactive), and the unique expected requirements of certain users.

If there are other resources to consider, flow proceeds along transition 906 and the process is repeated. Otherwise, flow proceeds along transition 907 and the desirability of each resource with respect to server s is outputted 908. This strategy is repeated for each of the servers in the environment.

The group manager can gather the data needed to define C[r,s], U[r,s], and A[r,s], for example, by querying the operating system with respect to that server. For example, the operating system can provide the system load with regard to processor utilization by determining the number of processes in the run queue at any given time. The operating system can provide the memory utilization by determining the amount of memory used compared to the total memory in the system. The operating system can provide bandwidth utilization by querying the network statistics with regard to the given interfaces.

In one embodiment, a desirability value D is determined for each of three primary resources, which are, processing power (measured in CPU clock cycles), main memory (in megabytes of RAM) and network bandwidth (in megabits per second). Once the resource-specific desirability values are computed, the minimum of the three values is chosen for each server as the overall desirability. The motivation to pick the minimum value is that this represents the resource subject to the most contention on that server. This resource (the one that is most heavily loaded) represents the resource that is most likely to become saturated first, and is therefore, most important in deciding how to balance load.

The minimum of the resource specific desirability is obtained by implementing the following pseudo-code:

```
Begin
    for each server s
        select D[s] where:
            D[s] = the minimum value of DR[r,s] over all resources
            where:
                D[s] = min{r} (DR[r,s])
    end
End.
```

Once the minimum resource specific desirabilities are determined each server is ranked by level of desirability and the most desirable target can be selected.

b. Unsteady State Load Balancing Strategy

The present invention allows for two or more loosely-coupled redundant servers to host sessions simultaneously for a set of DTUs. If one of these servers fails or reaches an unsteady state (e.g., the server loses the ability to maintain the sessions residing therein, for instance in the case of a power failure), each of the DTUs connected to it "fails over" to one of the surviving servers. This scenario creates an unsteady state, as the arrival rate of new sessions to the surviving server instantly becomes very large. It is crucial in this situation to distribute the new DTUs proportionally among the remaining servers (in the nontrivial case where there is more than one survivor) according to their respective carrying capacities.

Since the computational and memory resources allocated to the services requested by the DTUs are distributed across the group of servers, it is possible for resources to become unevenly allocated, thereby degrading performance on over-utilized servers while wasting resources on under-utilized servers. This is especially true in heterogeneous server configurations, where the carrying capacity of the servers (i.e., number and speed of processing units, amount of installed memory and available network bandwidth) is non-uniform. In this case, if a server with the lowest capacity responds first, all failed over DTUs may be redirected to this less powerful server, creating a seriously unbalanced load distribution and the risk of further server overload failures.

One prior art load balancing scheme assigns a session to the least loaded server at the time the user starts (or resumes) a session. However, this strategy can break down when faced with a deluge of sessions, because the system load may be sampled and averaged over relatively large time intervals providing a load metric that is insufficiently responsive to a large number of sessions joined substantially concurrently (e.g., fail over).

Since a large number of sessions can fail over in a matter of seconds, if every session were assigned to the server with the lowest reported load, it is possible for a disproportionate number of sessions to fail over to that server before its reported load has had time to adjust accordingly, potentially resulting in a badly skewed load distribution.

Figure 10A:
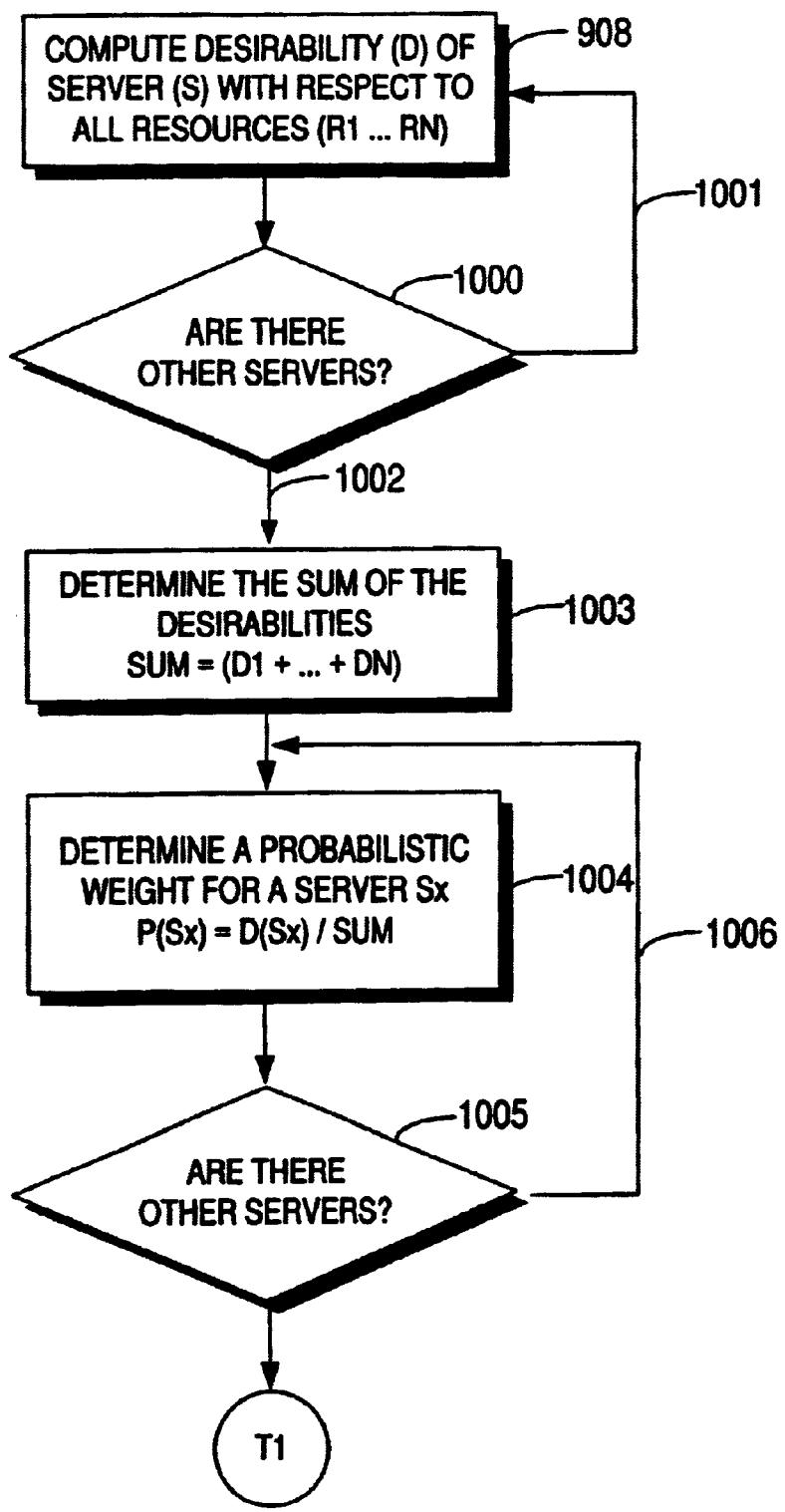
FIGS. 10a and 10b are flow control diagrams of the unsteady state load distribution strategy.
Figure 10B:
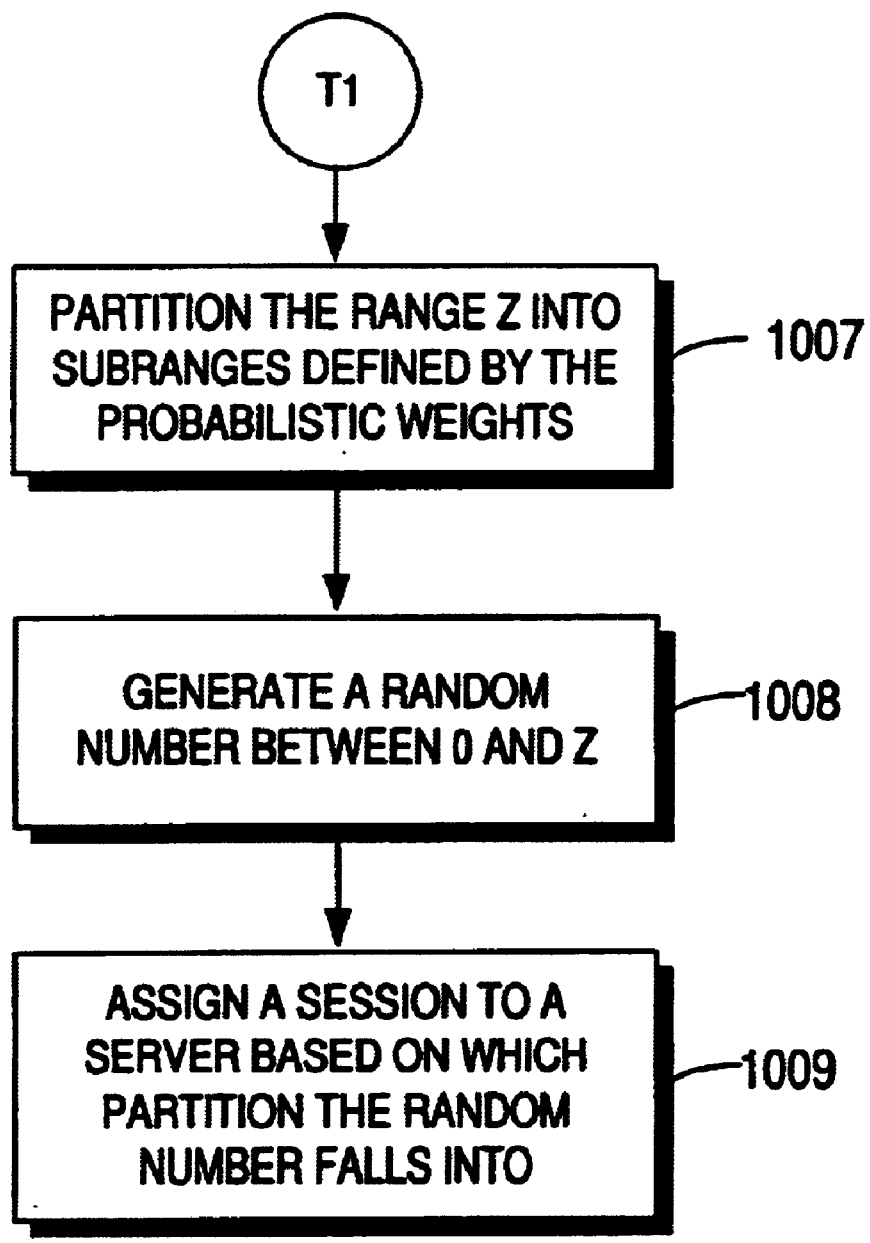

In this case, assignment to the least loaded server is not always the most effective method. In one embodiment, a pseudo-random strategy is used in unsteady states. FIG. 10a and 10b provides a flow control diagram of the pseudo-random strategy used in unsteady states. Initially, the group manager process 601 follows the steps provided in FIG. 9 to compute the desirability of assigning a session to a given server 908, by proceeding through steps 901, 902, 903, 904, 905, and 907 and transitioning at step 906 if other resources exist, or transitioning at step 907 if all resources have been tested.

Once all resources are determined, the strategy determines if other servers exist 1000. If so, flow transitions along 1001 and the process repeats by computing the desirability for other servers. If no other servers remain to be tested, flow transitions along path 1002 and the relative desirabilities are normalized to a predetermined range by the following steps. At step 1003 the sum of the desirabilities for each server is computed by adding each desirability. At step 1004, probabilistic weights are attached, by dividing the sum by the individual desirability. If there are other servers 1005, flow proceeds along transition 1006 and the process repeats for each server. When weights are determined for all available servers, each probabilistic weight is partitioned into a subrange z 1007. Thereafter, a random number is generated between 0 and z 1008. Whichever subrange the random number falls into receives the session 1009.

Using this scheme, for instance, more desirable servers are weighted in a manner which makes it more likely to receive a fail over. Likewise, servers determined to be more heavily loaded receive a lower probability. Take for example, the case of two servers, server a with a desirability of 8 and server b with a desirability of 2. In this scenario, one embodiment of the invention will normalize these desirabilities to a range between 0 and 1. Therefore, server a will receive the range 0 to 0.8, while server b will receive the range between 0.8 and 1. A random number is generated between 0 and 1. The random number will determine assignment to the server, for instance if 0.6 is generated, server a gets the session. Thus, the pseudo-random strategy weighs the probability of any server s being selected by its computed desirability D[s]. Thus, in the provided example, if the session exists on server b, the group manager process on server a then sends a redirect message to the DTU, telling it to reconnect to the server b.

c. Additional Factors Considered in Load Balancing and Hybrid Strategies

In one embodiment, the group manager can take into account the number of microprocessors at a given server when balancing load. With reference to FIG. 9, flow proceeds along steps 901–904, to determine the desirability by factoring in the number of microprocessors. In another embodiment, the number of sessions running on a given server relative to that server's carrying capacity (e.g., the maximum number of sessions that server can host) is a factor. Hence, in FIG. 9, flow transitions along steps 901–904. In another embodiment, the number of sessions running on a given server is a factor in computing desirability 904. An accurate snapshot of the number of sessions at any given time is known to the session manager running on the server. This embodiment may assume that over a large aggregate the type and amount of resources utilized by the sessions is similar and balances load based on this assumption.

In other embodiments, the states of sessions running on a server (e.g., active or inactive) is a factor. For instance, a server may retain a session but the user is not utilizing a DTU. For example, when user removes a smart card, it indicates to the server that the user will no longer be interacting with it, yet the session remains alive. This is analogous to turning off the monitor on a conventional computer but leaving the CPU running. In this case, a process executing for such a session can be given a lower priority with respect to the live sessions to reduce load at that time. Thus, with reference to FIG. 9, when flow proceeds along steps 901–904, the desirability can be based on session states. Therefore, the server can make the assumption that the user will be imposing a lighter load on the system and distribute load accordingly.

In one embodiment, the server implements a tunable parameter with respect to each session because certain sessions are predictable. For instance, users who work the morning shift and remove their smart cards at the end of the work day, will almost never reinitiate a session at night. On the other hand, other sessions can be unpredictable with a user logging on and off at unpredictable times. With these types of considerations, the tunable parameter can assign a lower weight to the times when the predictable session is not active.

In other embodiments, identifiers can be assigned to users which alert the system to the unique expected requirements of certain users. For instance, certain users are heavy users and routinely require CPU, memory, and bandwidth intensive resources while others may perform less intensive activities, such as checking e-mail. Therefore, the identity of the user can be used as an accurate method of determining the expected load on the system, for instance as a factor in steps 901–904 of FIG. 9.

In another embodiment the cost of redirection is considered. Redirection has a cost because to initiate a session on a server, the DTU must request authentication to the server, which can take up to several seconds. Once the server receives the authentication request, the group manager determines whether to accept the request, whether the session already exists on another server, in which case it will redirect the DTU to that server, or whether other servers have more available resources, which will cause the load balancing strategy to be employed.

If the result of the group manager's decision is to redirect the DTU to another server, the DTU must authenticate a second time on the selected target server. Since authentication takes a non-trivial amount of time, the cost of multiple authentications is considered in this embodiment. A variable factor is taken into account by the server in which the attempted authentication has occurred. For instance, the variable factor can be twenty percent. Therefore, the potential target server for redirection must have at least twenty percent more available resources than the attempted server. If the attempted and target servers are closer than the variable factor in their availability of a given resource, redirection does not occur and the cost associated with redirection is saved.

Figure 11:
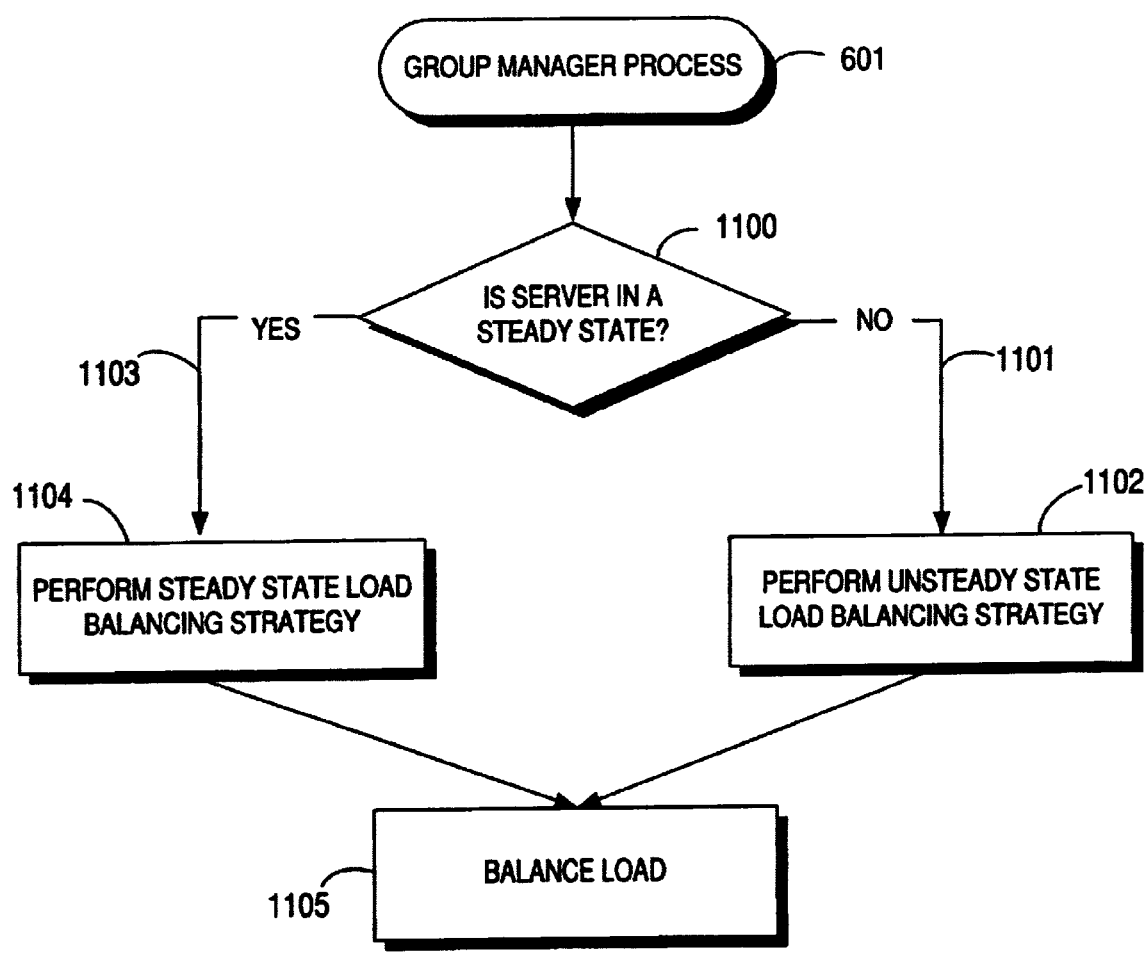
FIG. 11 is a flow control diagram of the hybrid strategy.

One embodiment of the present invention implements a hybrid strategy in employing the load balancing strategy. Referring to FIG. 11, the hybrid strategy combines the use of the steady state strategies, and the use of unsteady state strategies. Therefore, the information provided by the steady state load balancing strategy, such as processor, memory, or bandwidth utilization can be utilized when the group manager process determines that the server is in a steady state (i.e., the arrival rate of new sessions is low). The group manager process 601 determines if the server is in a steady or unsteady state 1100. If that the server is in an unsteady state (i.e., fail over causes the arrival rate of new sessions to instantly become large), flow proceeds along transition 1101 and the pseudo-random strategy 1102, and FIG. 10, is implemented to distribute failed over sessions more evenly among available resources 1105. If the server is in a steady state, (i.e., data is constant and the arrival rate of new sessions is low), flow proceeds along transition 1103 and the steady state strategy 1104, and FIG. 9, is implemented to distribute sessions more evenly among available resources 1105.

Thus, a method and apparatus for implementing load distribution strategies has been provided in conjunction with one or more specific embodiments. The invention is defined by the claims and their full scope of equivalents.

What is claimed is:

1. A method for a first server to redirect a session with a first station in a multiple server computing environment, the method comprising:

obtaining a first connection between said first server and said first station;

exchanging information between said first server and a second server; and redirecting said first station to said second server based on said information, wherein said redirecting step at said first server comprises:

determining a first desirability for said first server;

determining a second desirability for said second server; and pseudo-randomly, selecting a target server based on said first and second desirabilities; and wherein a plurality of computational services has been removed from said first station, wherein said first station provides an interface to a user, and wherein said first and second servers can each provide the plurality of computational services removed from said first station to said user, and wherein said first station is a client, wherein said plurality of computational services comprise a computational power for said client and a state maintenance for said client.

2. The method of claim 1, wherein determining said first and second desirabilities comprises determining an expected resource utilization.

3. The method of claim 1, wherein determining said first desirability comprises:

determining a resource capacity; and evaluating a function of said resource capacity and said expected resource utilization.

4. The method of claim 3, wherein determining said second desirability comprises:

determining a second resource capacity; and evaluating a second function of said second resource capacity and said expected resource utilization.

5. The method of claim 4, wherein said determining resource capacity, said determining expected resource utilization, and said evaluating steps are performed for each of a plurality of resources.

6. The method of claim 1, wherein said first server has a probability of selection weighted by said first desirability and said second server has a probability of selection weighted by said second desirability.

7. The method of claim 1, wherein said exchanged information comprises one of an amount of available Central Processing Unit (CPU) information, an amount of available Random Access Memory (RAM) information, an amount of available bandwidth information, and a number of sessions information.

8. An apparatus comprising:

a first server;

a first station having a connection with said first server, wherein said first server is configured to determine an expected resource utilization; and a second server, wherein said first and said second servers exchange information, and wherein said first server is configured to redirect said first station to said second server based on said information, wherein said first station is a client, said client providing an interface to a user and wherein each of said first and second servers can provide a plurality of computational services removed from said client to said user, and wherein said plurality of computational services comprise a computational power for said client and a state maintenance for said client.

9. The apparatus of claim 8, wherein said first server is configured to:

determine a first desirability for said first server;

determine a second desirability for said second server; and select a target server based on said first and second desirabilities.

10. The apparatus of claim 9, wherein said first server has a probability of selection weighted by said first desirability and said second server has a probability of selection weighted by said second desirability.

11. The apparatus of claim 8, wherein said first server is configured to:

determine a resource capacity; and evaluate a function of said resource capacity and said expected resource utilization.

12. The apparatus of claim 8, wherein said first server is configured to:

determine a resource capacity for each of a plurality of resources;

determine a corresponding expected resource utilization for each of said resources; and evaluate a function for each of said resource capacities and said corresponding expected resource utilizations.

13. The apparatus of claim 8, wherein said first server is configured to select a server associated with a highest desirability as the target server.

14. The apparatus of claim 8, wherein said first server is configured to select a target server pseudo-randomly.

* * * * *